Nov. 27, 1951  A. E. McKINSTRY  2,576,799
POSTHOLE AUGER FOR POWER SAWS
Filed Jan. 26, 1949  2 SHEETS—SHEET 1

INVENTOR.
Annie E. McKinstry
BY Victor J. Evans & Co.
ATTORNEYS

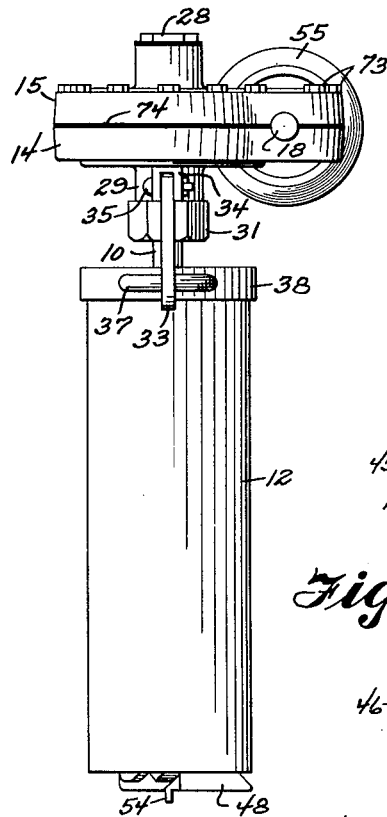
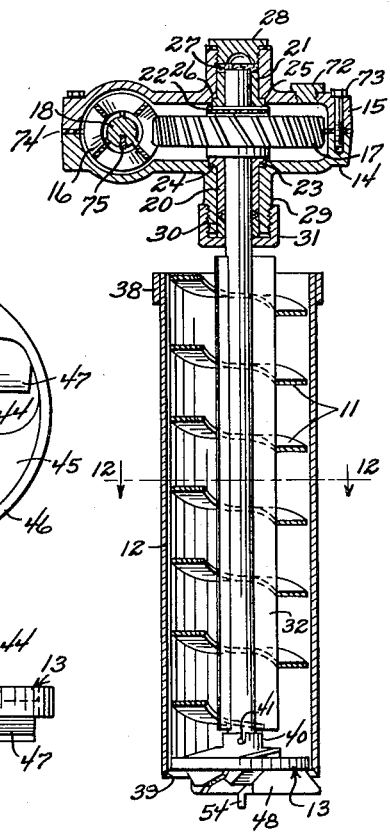
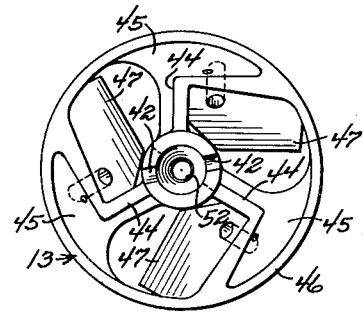
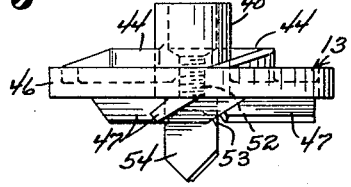
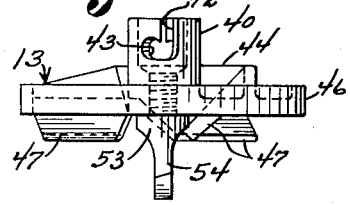
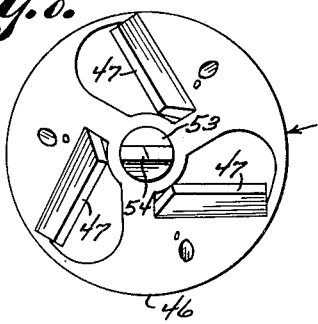
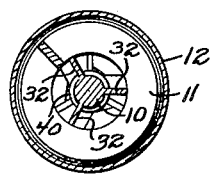
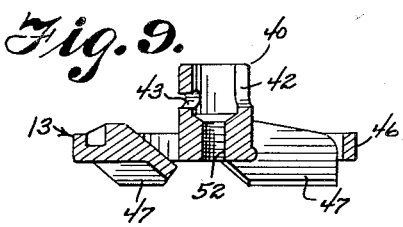
INVENTOR.
Annie E. M<sup>c</sup>Kinstry Patented Nov. 27, 1951

2,576,799

UNITED STATES PATENT OFFICE 2,576,799

POSTHOLE AUGER FOR POWER SAWS

Annie E. McKinstry, Brunswick, Ga.

Application January 26, 1949, Serial No. 72,831

9 Claims. (Cl. 255—19)

This invention relates to portable power actuated post hole diggers and boring tools, and in particular an elongated auger mounted on a vertically disposed shaft and surrounded by a thin tubular casing with plow points removably mounted on the lower end of the auger shaft and with the upper end of the shaft journaled in a casing with a jackshaft and worm gear therein through which the auger may be suspended and operated.

The purpose of this invention is to provide a plow actuated post hole auger that may readily be attached to the end of an arm of a power actuated implement or tractor and driven thereby.

Various types of farm implements and other power actuated devices have been provided for digging or boring post holes but wherein the usual type of screw auger is used, the leading end which is subjected to considerable abuse, due to rocks and the like, is often damaged and broken. With this thought in mind, this invention contemplates an improved post hole auger having a soil removing screw mounted on a shaft and surrounded by a tubular casing in which a plurality of scraper blades of rigid construction forming plow points are removably mounted on the end of the auger and the auger is journaled in a casing having operating means therein.

The object of this invention is to provide a post hole digging auger in the form of an attachment that may readily be applied to a power driven implement, tractor, or the like.

Another object of the invention is to provide a post hole auger having digging elements removably mounted on the leading end thereof.

A further object of the invention is to provide a power actuated post hole auger adapted to be attached to a power implement or machine which is of a simple and economical construction.

With these and other objects and advantages in view, the invention consists of the new and useful combination, construction, and arrangement of parts as hereinafter more fully described, set forth in the claims appended hereto, and disclosed in the accompanying drawings, forming part hereof, wherein:

Figure 3 is a side elevational view of the attachment looking toward the end of the jackshaft on which the attachment is mounted;

Figure 4 is a vertical cross-section through the attachment taken on line 4—4 of Figure 2;

Figure 5 is a plan view of a plow point carrying spider which is mounted on the lower end of the auger shaft, and with the shaft removed;

Figure 6 is a side elevational view of the spider illustrated in Figure 5;

Figure 7 is an elevational view of the spider taken at right angles to the view shown in Figure 6 and showing a side view of a center point removably mounted in the spider;

Figure 8 is a view looking upward toward the undersurface of the spider;

Figure 9 is a cross-section through the spider with the plow points and center point omitted;

Figure 12 is a cross-section through the auger taken on line 12—12 of Figure 4.

Figure 1:
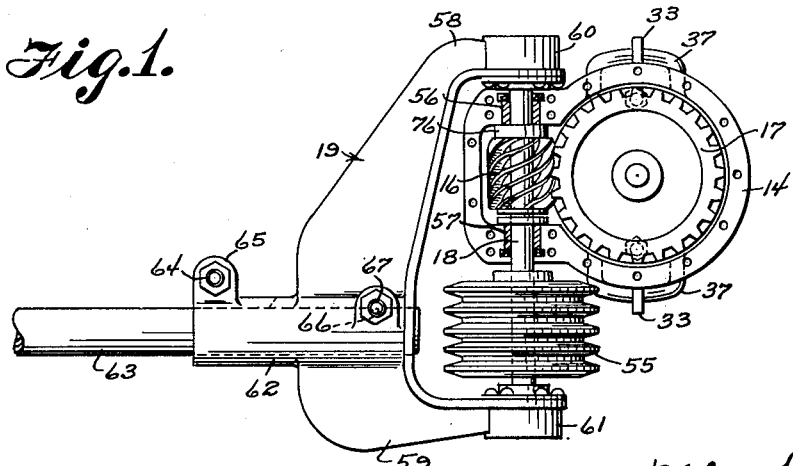
Figure 1 is a plan view of the attachment with the cover plate of the gear housing omitted and with the end of an arm, to which the device may be attached, broken away.

Referring now to the drawings, wherein like reference characters denote corresponding parts, the post hole auger of this invention includes a shaft 10 having a spiral vane 11 forming a soil removing screw mounted thereon with an outer tubular casing 12 and a plow point mounting spider 13, with the shaft journaled in a casing 14 having a cover 15 and driven by worm gears 16 and 17 which are driven from a jackshaft 18 journaled in a sprocket 19.

The shaft 10 is journaled in the housing through a bearing 20 in the housing 14 and a bearing 21 in the cover 15, and a thrust bearing 22 is provided between the gear 17 and the end of the bearing 21. The bearing 20 is provided with a small flange 23 that seats in a recess 24 and the bearing 21 is provided with a similar flange 25 that seats in a recess 26. A packing washer 27 is provided at the upper end of the shaft and this is held by a nut 28. The housing 14 is provided with a tubular extension 29 having a packing gland 30 therein which is held by a nut 31.

The spiral vane 11 is mounted on the shaft through radially disposed ribs 32, as shown in Figure 12 and the peripheral edges of the vanes are spaced slightly from the inner surface of the tubular casing 12 providing a screw conveyor with an open center, as shown in Figure 4. The casing 12 is suspended from the housing 14 by arms 33 which are pivotally mounted in lugs 34 on the underside of the housing by pins 35, and the inner surfaces of the lower ends of the arms are provided with notches 36 that fit over extensions 37 on a ring 38 at the upper end of the casing. The casing is provided with a beveled lower edge 39, as shown in Figure 4.

Figure 10:
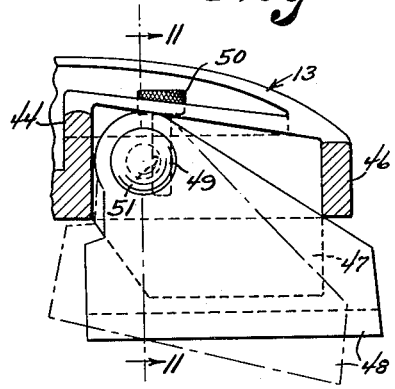
Figure 10 is a detail showing a section through one side of the spider with parts broken away and showing the method of mounting the blades or plow points in the spider.
Figure 11:
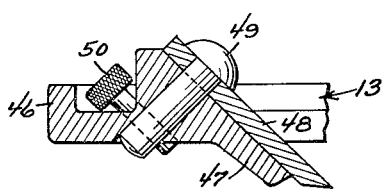
Figure 11 is a cross-section through the mounting means taken on line 11—11 of Figure 10.

The spider 13 is carried by the lower end of the shaft 10 and, as shown in the drawings, the lower end of the shaft extends into a hub 40 extending upwardly from the spider, the spider being connected to the shaft by a bayonet connection formed by pins 41 projecting from the sides of the shaft and extended into vertically disposed slots 42 in the sides of the hub with the slots communicating with transversely disposed recesses 43. The spider 13 is formed with radially disposed ribs 44 connected by webs 45 to an outer peripheral ring 46, as shown in Figure 5. As illustrated in Figures 10 and 11, the ribs 44 are formed with sloping surfaces 47 on which blades 48 having beveled lower ends are mounted by pins 49, and the pins are secured in position by knurled headed studs 50 that are inserted in openings in the ribs and positioned in notches 51 in the pins. The blades 48 function as plow points. The hub 40 of the spider is provided with a threaded socket 52 in which a flat center point 53 is mounted as shown in Figure 7. This point is provided with a beveled lower end 54 and it will be understood that the point may be of any suitable shape.

The worm gear 17 is fixedly mounted on the upper end of the shaft 10, as shown in Figure 1, this gear meshes with a worm 16 on the jackshaft 18 and the jackshaft is provided with a pulley 55 whereby it may be driven from any suitable power source. Although a pulley of the V-belt type is shown, it will be understood that a pulley or sheaves of any type may be used. The jackshaft 18 journaled in the housing 14 by bearings 56 and 57 and the ends thereof are journaled in extending arms 58 and 59 of the bracket 19 by bearings 60 and 61, as shown in Figure 1.

In the design shown, the bracket 19 is provided with an extending hub or sleeve 62 through which the bracket and auger attachment may be mounted on an arm or rod 63. The bracket is held on the rod 63 by a clamp bolt 64 extended through lugs 65 on the split outer end of the hub and the rod 63 is provided with a notch 66 that is positioned to receive a bolt 67 in the inner part of the hub.

By this means, the post hole auger may be attached to a power operated implement, such as a power saw, or mounted on an extending part of a tractor and the housing 14 with the jackshaft 18 extended therethrough may be attached by any suitable means or, with the jackshaft mounted in the bracket 19, the bracket may be attached to any suitable part of the power device.

Figure 2:
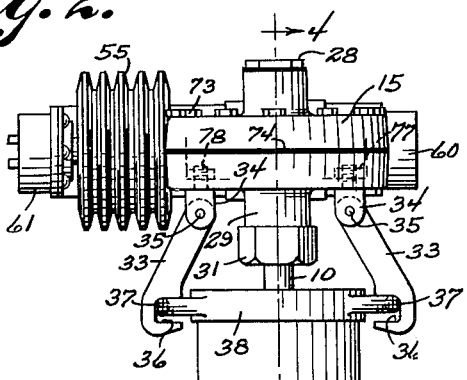
Figure 2 is a view showing a front elevation of the attachment.

The gear housing 14 may be packed with grease and for this purpose, a filling plug 72 is provided in the cover 15 and the cover is removably mounted on the housing by bolts 73 with a gasket 74 between the cover and housing. The worm 16 which is positioned in the housing is keyed to the shaft 18 by a key 75 and a thrust bearing 76 may be provided between the end of the worm and inner surface of the housing. The tubular casing 12 is removably mounted on the housing and the arms 33 by which the tubular casing is held are also removably mounted through the lugs 34 which are held by nuts 77 on threaded studs 78 extending into the housing, as shown in Figure 2.

With the parts arranged in this manner, the attachment is substantially flexible in that it may be attached to any suitable power source.

It will be understood that other modifications may be made in the design and arrangement of the parts without departing from the spirit of the invention.

What is claimed is:

1. A post hole auger comprising a gear housing, a shaft journaled in the housing and depending therefrom, shaft operating gears positioned in the housing, elongated radially disposed ribs carried by the shaft, a spiral vane carried by the said ribs providing a screw conveyor with a substantially open center, plow points removably mounted on the lower end of the shaft, and means attaching the housing to a power source.

2. A post hole auger comprising a gear housing, a shaft journaled in the housing and depending therefrom, shaft operating gears positioned in the housing, elongated radially disposed ribs carried by the shaft, a spiral vane carried by the said ribs providing a screw conveyor with a substantially open center, plow points removably mounted on the lower end of the shaft, a tubular casing surrounding said auger, and means attaching the housing to a power source.

3. A post hole auger comprising a gear housing, a shaft journaled in the housing and depending therefrom, shaft operating gears positioned in the housing, elongated radially disposed ribs carried by the shaft, a spiral vane carried by the the said ribs providing a screw conveyor with a substantially open center, plow points removably mounted on the lower end of the shaft, a tubular casing removably suspended from said housing and surrounding the auger, and means attaching the housing to a power source.

4. A post hole auger comprising a gear housing, a shaft journaled in the housing and depending therefrom, shaft operating gears positioned in the housing, elongated radially disposed ribs carried by the shaft, a spiral vane carried by the said ribs providing a screw conveyor with a substantially open center, a spider mounted on the lower end of the shaft, plow points removably mounted in the spider, and means attaching the housing to a power source.

5. In a post hole auger, the combination which comprises a gear housing, a shaft journaled in the housing and depending therefrom, shaft operating gears positioned in the housing, elongated radially disposed ribs carried by the shaft, a spiral vane mounted on the ribs providing a screw conveyor with a substantially open center, a spider removably mounted on the lower end of the shaft, plow points removably mounted in inclined positions in the spider, a tubular casing surrounding the auger, means attaching the casing to the housing, and means attaching the housing to a power source.

6. In a post hole auger, the combination which comprises a gear housing, an auger shaft journaled in the housing and depending therefrom, shaft operating gears positioned in the housing, elongated radially disposed ribs carried by the shaft, a spiral vane mounted on the ribs providing a screw conveyor with a substantially open center, a spider removably mounted on the lower end of the shaft, plow points removably mounted in inclined positions in the spider, a tubular casing surrounding the auger, means attaching the casing to the housing, a jackshaft journaled in the housing, and means attaching the housing to a power source.

7. In a post hole auger, the combination which comprises a gear housing, an auger shaft journaled in the housing and depending therefrom, shaft operating gears positioned in the housing, elongated radially disposed ribs carried by the shaft, a spiral vane mounted on the ribs providing a screw conveyor with a substantially open center, a spider removably mounted on the lower end of the shaft, plow points removably mounted in inclined positions in the spider, a tubular casing surrounding the auger, means attaching the casing to the housing, a jackshaft having a pulley thereon journaled in the housing, said gears mounted on said shafts, and a bracket for attaching the housing to a power operated device.

8. In a post hole auger, the combination which comprises a gear housing, an auger shaft journaled in the housing and depending therefrom, shaft operating gears positioned in the housing, elongated radially disposed ribs carried by the shaft, a spiral vane mounted on the ribs providing a screw conveyor with a substantially open center, a spider removably mounted on the lower end of the shaft, plow points removably mounted in inclined positions in the spider, a tubular casing surrounding the auger, means attaching the casing to the housing, a jackshaft having a pulley thereon journaled in the housing, said gears mounted on said shafts, a bracket for attaching the housing to a power operated device, and a center point removably mounted in the spider.

9. In a post hole auger, the combination which comprises a gear housing, an auger shaft journaled in the housing and depending therefrom, shaft operating gears positioned in the housing, elongated radially disposed ribs carried by the shaft, a spiral vane mounted on the ribs providing a screw conveyor with a substantially open center, a spider removably mounted on the lower end of the shaft, plow points removably mounted in inclined positions in the spider, means adjusting the positions of the said plow points, a tubular casing surrounding the auger, means attaching the casing to the housing, a jackshaft having a pulley thereon journaled in the housing, said gears mounted on said shafts, a bracket for attaching the housing to a power operated device, and a center point removably mounted in the spider.

ANNIE E. McKINSTRY.

REFERENCES CITED

The following references are of record in the file of this patent:

UNITED STATES PATENTS

| Number | Name | Date |
|---|---|---|
| 1,319,259 | Adams | Oct. 21, 1919 |
| 1,997,887 | Prior | Apr. 16, 1935 |
| 2,217,300 | Templeton | Oct. 8, 1940 |
| 2,286,583 | Shoup | June 16, 1942 |
| 2,320,612 | Kandle | June 1, 1943 |
| 2,411,627 | Jaques | Nov. 26, 1946 |